(12) United States Patent
Frotscher

(10) Patent No.: US 6,929,580 B2
(45) Date of Patent: Aug. 16, 2005

(54) CONTROLLING OF AN AUTOMATED STARTING ELEMENT

(75) Inventor: Gerd Frotscher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/194,025

(22) Filed: Jul. 11, 2002

(65) Prior Publication Data

US 2003/0022759 A1 Jan. 30, 2003

(30) Foreign Application Priority Data

Jul. 24, 2001 (DE) .......................... 101 35 899

(51) Int. Cl.⁷ .............................................. B60K 41/02
(52) U.S. Cl. ............................................ 477/76; 477/176
(58) Field of Search ........................ 477/72, 98, 174, 477/176, 180, 181, 76, 83, 84, 97

(56) References Cited

U.S. PATENT DOCUMENTS

| | | | | |
|---|---|---|---|---|
| 5,010,989 A | * | 4/1991 | Huntley | ........................ 477/39 |
| 5,060,770 A | * | 10/1991 | Hirano et al. | .................. 477/39 |
| 5,094,332 A | | 3/1992 | Wall | .......................... 192/82 T |
| 5,170,868 A | | 12/1992 | Yamashita et al. | ........ 192/0.032 |
| 5,307,269 A | * | 4/1994 | Kohno | .................... 477/174 X |
| 5,499,954 A | * | 3/1996 | Wagner et al. | ................ 477/174 |
| 5,679,099 A | * | 10/1997 | Kato et al. | ................... 477/176 |
| 6,113,515 A | * | 9/2000 | Salecker et al. | ............... 477/72 |
| 6,341,679 B1 | * | 1/2002 | Abe et al. | ................... 192/3.29 |
| 6,468,182 B1 | * | 10/2002 | Brandt et al. | .................. 477/98 |
| 6,482,123 B2 | * | 11/2002 | Steeby | ......................... 477/98 |

FOREIGN PATENT DOCUMENTS

| | | | |
|---|---|---|---|
| DE | 41 35 969 A1 | 5/1992 | .......... B60K/23/02 |
| DE | 192 02 006 A1 | 8/1996 | ........... B60K/23/00 |
| DE | 196 31 294 A1 | 2/1997 | ........... F16H/37/02 |
| DE | 196 41 074 A1 | 4/1998 | ........... B60K/41/22 |
| DE | 198 15 259 A1 | 10/1998 | ........... B60K/23/02 |
| DE | 198 18 809 A1 | 12/1998 | ........... F16D/38/06 |

* cited by examiner

*Primary Examiner*—Roger Pang
(74) *Attorney, Agent, or Firm*—Davis & Bujold, P.L.L.C.

(57) ABSTRACT

The method for control of an automated starting element such as a starting clutch or starting brake according to the thermal load of the starting clutch, which method regulates the control parameters according to a determined driving state, a tractional resistance and/or an actual clutch temperature, has one control module (1) which, below a critical control parameter limit starting from which an increased thermal load or an increased wear appears, reduced the friction work of the starting element. The reduction takes place by a reduction of the slipping time by regulating the slip in the starting element and/or by influencing at least one of the parameters ($\mu$, proportional/integral or differential parts, M_Control, p_Gradient or n_Nominal), the number of steps simultaneously used for reducing the friction work increasing with the temperature of the clutch.

9 Claims, 1 Drawing Sheet

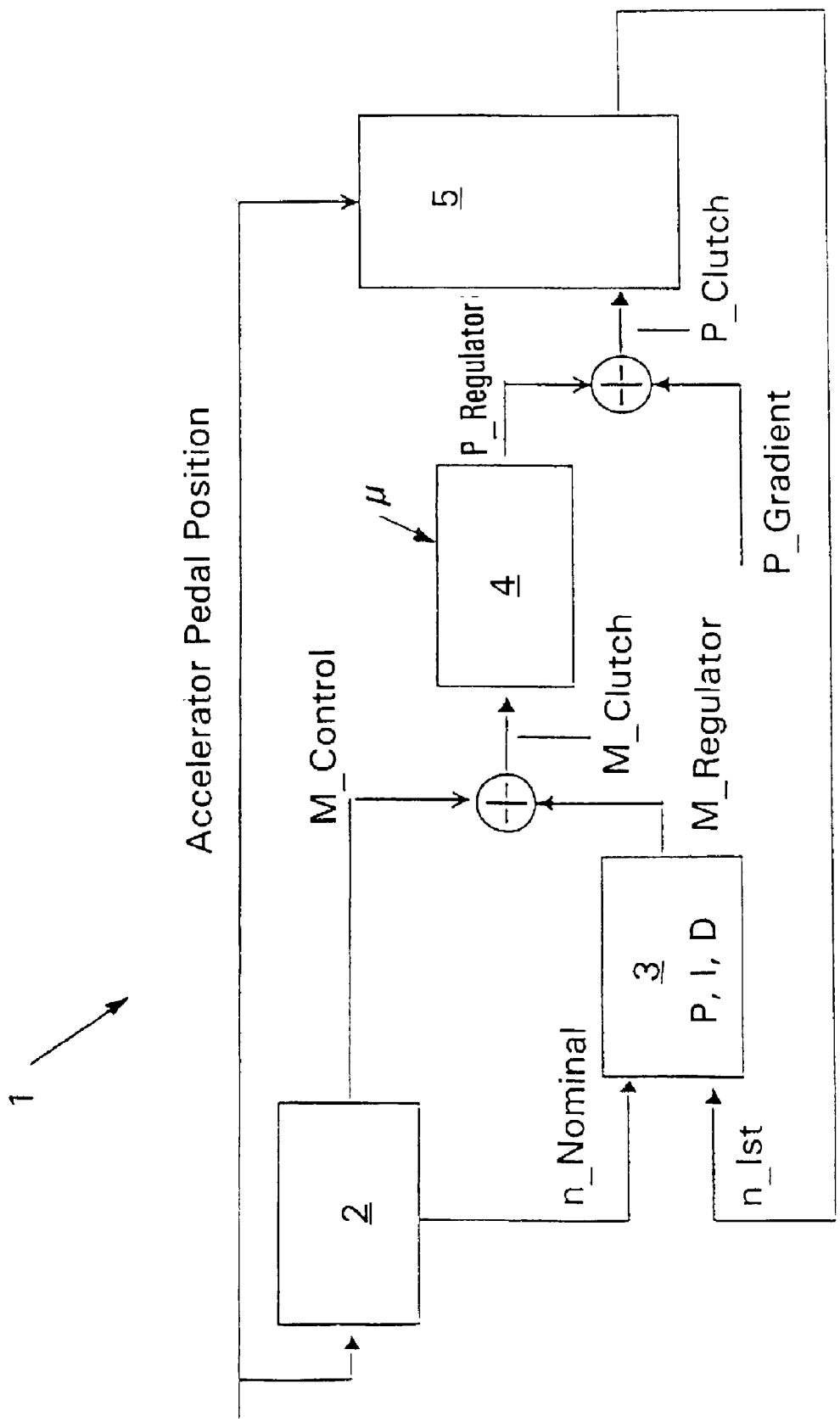

CONTROLLING OF AN AUTOMATED STARTING ELEMENT

FIELD OF THE INVENTION

The invention relates to a method and device for controlling an automated starting element of a motor vehicle in accordance with the thermal load of the starting element. For the sake of simplicity, it is assumed herebelow that as starting element starting clutches are used even though a starting brake can be used instead of a starting clutch.

BACKGROUND OF THE INVENTION

In certain driving situations a great tractional resistance can result, for example, when driving uphill with trailers, when repeatedly starting with only brief pauses, or when tow starting another vehicle in the off-road use. Automated starting clutches can become thermally overloaded and wear out more quickly in case of very great tractional resistance, but also when creep driving with stepped speed and conscious operating error, for example, due to "stall speed", to a slip between parts and a heating resulting from an increased charge of energy. The consequence is damage to clutch parts, such as lined and steel discs, the same as the thermal decomposition of the transmission oil.

It should, therefore, be prevented that the thermal load limits of the clutch or of the oil be exceeded. Different methods have already become known which make the driver aware of an increased clutch load. For this purpose, optical or acoustical signals the same as clutch pulses are used, for example, which are emitted upon exceeding a limit value defined by a critical driving state starting from which an increased wear is to be feared. For defining such a limit value, different operating parameters are considered such as the friction work, the engine rotational speed, the temperature increase, or the slip value.

On the basis of such limit values, it is also possible to reduce the clutch load by the effect of the clutch control or of the engine control and thus to reduce the danger of a thermal overload. This can be done, for example, by a ramp-like increase of the clutch torque or in the engine by an injection scattering.

DE 198 15 259 A1 has disclosed a device for control of an automated clutch in the output train which device determines the clutch slip in the area of the clutch friction lining and with an actuation unit adjusts the torque transmitted by the clutch. By means of the clutch slip and of the transmitted torque are determined the energy charge in the area of the clutch friction linings, a temperature increase of the friction linings compared to a limit value, or an increased wear of the linings. Depending on an increased energy charge, a temperature increase or an increased wear compared to a limit value, the control unit controls in a first time phase the transmitted clutch torque not affected by the energy charge. In a second time phase, the torque transmitted by the clutch is controlled by time and in a third time phase the transmitted torque is increased until the engine rotational speed exceeds a threshold value or until a certain period of time has elapsed. At the same time in the second time phase a soft warning of the driver is effected by a pulsing motion and in the third time phase a clearly traceable shake or jerk is felt.

DE 196 02 006 A1 outlines a device and a method for control of a clutch in which an actuator controls the adjustment of the torque transmitted by the clutch. If the duration of time of an operating state with increased wear or increased thermal load is exceeded, this is indicated to the driver by a dynamic behavior of the drive train. At the same time, the vehicle remains movable in every situation with said dynamic behavior. Such a dynamic behavior results, for example, by control variable in time of the transmitted torque, specifically in a manner such that periodic, aperiodic or static fluctuations of the transmitted torque result. For the control are determined the friction charge in the friction faces of the clutch as function of time and the temperature of the clutch as function of time. System variables can be used for this purpose such as operating state, gear position torque, slip, engine rotational speed, transmission input rotational speed, suction pressure, speed signals, clutch adjustment signal, transmission output rotational speed, transmitted clutch torque, engine torque, temperature sensor signal, gradient sensor signal and gear position.

Most of the system variables used for control of the clutches are determined by simple measuring devices such as sensors and detectors or are determined by adjustment of the corresponding actuating device.

However, measuring of the temperature on the clutch is complicated. Measuring of temperature, via the outflowing coolant, is particularly expensive in clutches in which both halves are rotatable. It is also difficult to accommodate a temperature sensor close enough to the rotating parts.

DE 196 41 074 A1 has made known for determining the temperature of a starting clutch a method in which, based on the temperature of the environment of the starting clutch, the actual temperature thereof is calculated by integration of the temperature change. The differential temperature is here proportional to the difference from the friction work of the clutch and the heat loss, which difference is determined from the dissipated flow of the coolant.

SUMMARY OF THE INVENTION

Accordingly, a method is proposed or control of an automated starting element depending on the thermal load of the starting element with a control module in which the control module regulates the control parameters according to a determined driving state, a tractional resistance and/or an actual clutch temperature. The control module reduces below a critical control parameter limit, starting from which an increased thermal load or an increased wear appears, the friction work of the starting clutch by reducing the slipping time. For this purpose at least one of the following steps is used: regulation of the slip in the starting element and/or control of one of the parameters friction value $\mu$, proportional/integral or differential parts of the engine rotational speed regulator, controlled motor-dependent torque part (M_Control), controlled engine-independent pressure part (p_Gradient), or nominal rotational speed ((n_Nominal), the number of steps simultaneously used for reducing the friction work increasing with the clutch temperature.

Further outlined is a device with which the inventive method can be applied and which has an engine control unit with nominal value standard for delivering a nominal rotational speed and a controlled engine-dependent torque part, an engine rotational speed regulator for emitting a control torque according to an actual and a nominal rotational speed of the engine, the same as a proportional, an integral or differential part and a pressure calculation unit for calculating the clutch control pressure.

The expert is well acquainted with automated starting clutches and the control thereof via different system variables determined by conventional means so that here only the characteristic properties of the invention are discussed.

In the inventive method, the thermal load can already be reduced below a critical limit by adequately influencing the control parameters. According to a preferred embodiment of the invention, the driver is not informed during the starting operation about the thermal load of the starting element so that he does not register the control operation. In the method, different control parameters are changed according to the determined driving state or tractional resistance and the actual clutch temperature. The tractional resistance is indicated by an ASIS method developed by the Applicant. In case of dry starting elements (brake/clutch), the clutch temperature is calculated via a temperature pattern. In case of oil-cooled starting elements, the clutch temperature is determined by the cooling oil temperature of the sprayed off clutch cooling oil, as has been described in DE 196 41 074 A1. By influencing the control parameters the friction work of the clutch is reduced during the starting operation.

For reducing the friction work of the starting clutch and lessening the slipping time, the inventive method has several steps which can be used separately or in combination. The thermal state of the starting clutch is decisive for this. The higher the load or the temperature of the sprayed off oil, the more extensive the steps regarding abbreviation of the slipping time, that is, so much the more the individual steps of the inventive method are simultaneously carried out.

In the method different regulation arrangements are basically followed. In a regulation of the clutch torque, the friction value of the clutch lining is taken into account. The starting regulation is affected by a proportional/integral or differential part of the engine rotational speed, an engine-dependent rotational speed part, a nominal rotational speed and a pressure part dependent on the engine torque. A slip regulation controls the nominal slip after the end of the starting operation.

For regulation of the clutch torque while calculating the clutch pressure, a friction value is taken into account which drops as the slipping times are longer. For calculation of the clutch pressure from the preset clutch torque, together with geometrically conditioned factors, the friction value of the clutch lining needs:

$$P_{clutch} = T_{clutch} * \text{constant/friction value}$$

The friction value has hitherto been considered as constant during the slipping phase. But during longer slipping periods a friction value drop is actually realistic. This drop of friction value is taken into account when calculating the clutch pressure in order to reduce the slipping time of the clutch.

To minimize the slipping time, different steps are carried out in the starting regulation.

In the first place, a proportional part or in case of a proportional/integral or differential (PID) regulator an integral or differential part of the engine rotational speed or clutch differential rotational speed is enlarged under increasing tractional resistance and/or under increasing clutch temperature. This occurs in certain stability limits according to the tractional resistance and the temperature of the clutch or of the cooling oil. In case of high tractional resistances and clutch or cooling oil temperatures, the clutch regulating pressure increases and thus the output error or the engine rotational speed or clutch differential rotational speed become smaller or the nominal value is more quickly reached.

In the starting regulation, a controlled engine-dependent torque part can also be enlarged under a rising tractional resistance and/or under a rising clutch temperature. This increase likewise takes place according to the tractional resistance and the clutch temperature or the cooling oil temperatures, the controlled part increases and thus the output error or engine rotational speed or clutch differential rotational speed becomes lower.

Besides, it is possible during the starting regulation to reduce a nominal rotational speed under an increasing tractional resistance and/or under an increasing clutch temperature during the starting operation. In case of high tractional resistances and clutch or cooling oil temperatures, the nominal rotational speed is reduced before or during the starting operation and the clutch load thus becomes smaller.

Finally, it is possible during the starting regulation to add to a regulation pressure a controlled engine independent pressure portion after lapse of a preset slipping time in accordance with the tractional resistance and/or the clutch temperature. The added engine-independent part has the form of a constant offset pressure or of a pressure gradient (pressure ramp). At the same time the defined slipping time can also depend on the tractional resistance and/or the clutch temperature or the cooling oil temperature. The consequence of the additional engine-independent portion is an earlier closing of the clutch.

In the last possible regulation step of the inventive method, the thermal load of the starting clutch can be further reduced under high tractional resistances and/or high cooling oil temperatures if after the starting operation, when the starting clutch is substantially closed, the slipping regulation, mainly carried out to insulate the swinging, is limited. This can be effected by either a reduction of the nominal slip or a complete temporary interruption of the slip regulation until the clutch has cooled off or the cooling oil temperature has lowered.

A distinction as to whether it is a starting operation or a conscious operating error (stall speed) that is involved can be made by taking into account the output rotation speed. Starting operation: $n_{ab} > 0 \text{ min}^{-1}$.

BRIEF DESCRIPTION OF THE DRAWING

The invention will now be described, by way of example, with reference to the accompanying drawings in which:

FIG. 1 shows a block gear shift pattern of an inventive device for control of an automated starting elements.

DETAILED DESCRIPTION OF THE INVENTION

The FIGURE shows a block gear shift pattern of an inventive device for control of an automated starting element such as a starting clutch in accordance with the thermal load of the starting clutch with which the above described method can be applied. The device has a control module 1 which has one engine control unit and nominal value standard 2 for delivering a nominal rotational speed n_Nominal and a controlled engine-dependent torque part M_Control, one engine rotational speed or differential rotational speed regulator 3 for delivering a proportional and/or an integral and/or a differential part PID of the differential rotational speed of the engine and clutch according to an actual and a nominal rotational speed of the engine and one calculation unit 4 of the clutch pressure for calculating the clutch regulation pressure p_Regulator.

Depending on an accelerator pedal position selected by the driver, a specific engine rotational speed n_Nominal is required which is delivered to the control unit 2 and to a vehicle 5. The vehicle 5 delivers an actual rotational speed n_Ist and the control unit 2 a nominal rotational speed n_Nominal to the engine rotational speed or the clutch differential rotational speed 3. According to the invention, the nominal rotational speed n_Nominal can be reduced depending on the tractional resistance and the clutch temperature. The rotational speed regulator 3 regulates a rotational speed which, while the tractional resistance increases and/or the clutch temperature increases, is reduced by a rising proportional/integral or differential part. To the regulator correcting variable is added a part M_Control engine-dependent on the control unit 2.

The correcting variable is introduced in the pressure calculation unit 4 where the clutch regulating pressure is calculated taking into account a dropping friction value $\mu$. To the clutch regulating pressure is added in the form of a pressure gradient. After laps of a preset slipping time, an engine-independent pressure part p_Gradient wherefrom results the clutch pressure p_Clutch abutting on the vehicle 5.

REFERENCE NUMERALS

1 control module
2 engine control unit and nominal value standard
3 engine rotational speed regulator
4 calculation unit of clutch pressure
5 vehicle

What is claimed is:

1. A method for controlling an automated start-up clutch of a vehicle transmission according to a thermal load of the start-up clutch, the method comprising the steps of:
   determining at least one of a driving state, a tractional resistance and the thermal load of the start-up clutch for the vehicle;
   controlling the start-up clutch by providing a control module for regulating at least one of a plurality of clutch control parameters according to at least one of the driving state, the tractional resistance and the thermal load of the start-up clutch for the vehicle;
   determining a change in the thermal load for the start-up clutch according to at least one of an increased thermal load value and an increased wear value;
   reducing friction work of said start-up clutch to reduce the thermal load of the start-up clutch below a critical control limit value by reducing slip in the start-up clutch;
   regulating the slip in the start-up clutch via the control module according to at least one of the following control parameters:
      a friction value of the start-up clutch;
      a proportional, integral or differential portion of at least one of an engine dependent part rotational speed value (M_Control), a nominal engine rotational speed value (n_Nominal), and an engine torque dependent pressure part value (p_Gradient);
   adding the engine torque dependent pressure part value (p_Gradient) to a regulating pressure (p_Regulator) after lapse of a preset slipping time according to at least one of an increasing tractional resistance and an increasing clutch temperature; and,
   utilizing a plurality of the control parameters to simultaneously regulate the slip in the start-up clutch and reduce the friction work in the start-up clutch and correspondingly lower the thermal load of the start-up clutch.

2. The method according to claim 1 further comprising the step of providing no information to a driver of the vehicle regarding the thermal load of the start-up clutch.

3. The method according to claim 1 further comprising the step of calculating a clutch pressure (p_Clutch) and accounting for a drop in the friction value with a long supping time of the start-up clutch.

4. The method according to claim 1, further comprising the step of increasing a proportional, integral or differential portion of one of an engine rotational speed regulator and a clutch differential speed regulator (3) according to an increasing tractional resistance and an increasing clutch temperature.

5. The method according to claim 1, further comprising the step of increasing the proportional, integral or differential portion of the engine dependent part rotational speed value (M_Control), according to at least one of an increasing tractional resistance and an increasing clutch temperature.

6. The method according to claim 1, further comprising the step of reducing the nominal engine rotational speed value (n_Nominal) during a starting operation according to at least one of an increasing tractional resistance and an increasing clutch temperature.

7. The method according to claim 1, further comprising the step of regulating slip in the start-up clutch by presetting a nominal slip value equal to zero during the regulation of the slip in the start-up clutch with the clutch substantially closed after a starting operation.

8. A method for controlling an automated starting element of a vehicle transmission according to a thermal load of the starting element the method comprising the steps of:
   utilizing one of a start-up clutch and a start-up brake as the starting element;
   determining at least one of a driving state, a tractional resistance and the thermal load of the starting element for the vehicle;
   controlling the starting element by providing a control module for regulating at least one of a plurality of clutch control parameters according to at least one of the driving state, the tractional resistance and the thermal load of the start-up clutch for the vehicle;
   determining a change in the thermal load for the starting element according to at least one of an increased thermal load value and an increased wear value;
   calculating a clutch pressure (p_Clutch) and accounting for a drop in the friction value with a long slipping time of the starting element;
   reducing friction work of said starting element to reduce the thermal load of the start-up clutch below a critical control limit value by reducing slip in the starting element;
   regulating the slip in the starting element via the control module according to at least one of the following control parameters:
      a friction value of the starting element;
      a proportional, integral or differential portion of at least one of an engine dependent part rotational speed value (M_Control), a nominal engine rotational speed value (n_Nominal), and an engine torque dependent pressure part value (p_Gradient);
   utilizing a plurality of the control parameters to simultaneously regulate the slip in the starting element and reduce the friction work in the starting element and correspondingly lower the thermal load of the starting element; including
   increasing a proportional, integral or differential portion of one of an engine rotational speed regulator and a clutch differential speed regulator (3) according to an increasing tractional resistance and an increasing clutch temperature, and increasing the proportional, integral or differential portion of the engine dependent part rotational speed value (M_Control), according to at least one of the increasing tractional resistance and the increasing clutch temperature, reducing the nominal engine rotational speed value (n_Nominal) during a starting operation according to at least one of the increasing tractional resistance and the increasing clutch temperature, and adding the engine torque dependent pressure pert value (p_Gradient) to a regulating pressure (p_Regulator) after lapse of a preset slipping time according to at least one of the increasing tractional resistance end the increasing clutch temperature; and providing no information to a driver of the vehicle regarding the thermal load of the starting element.

9. The method according to claim 8, further comprising the step of regulating slip in the starting element by presetting a nominal slip value equal to zero during the regulation of the slip in the starting element with the starting element substantially dosed after the starting operation.

* * * * *